Jan. 4, 1927.
W. H. MUZZY
LIQUID LEVEL INDICATOR
Filed Oct. 20, 1919
1,612,829
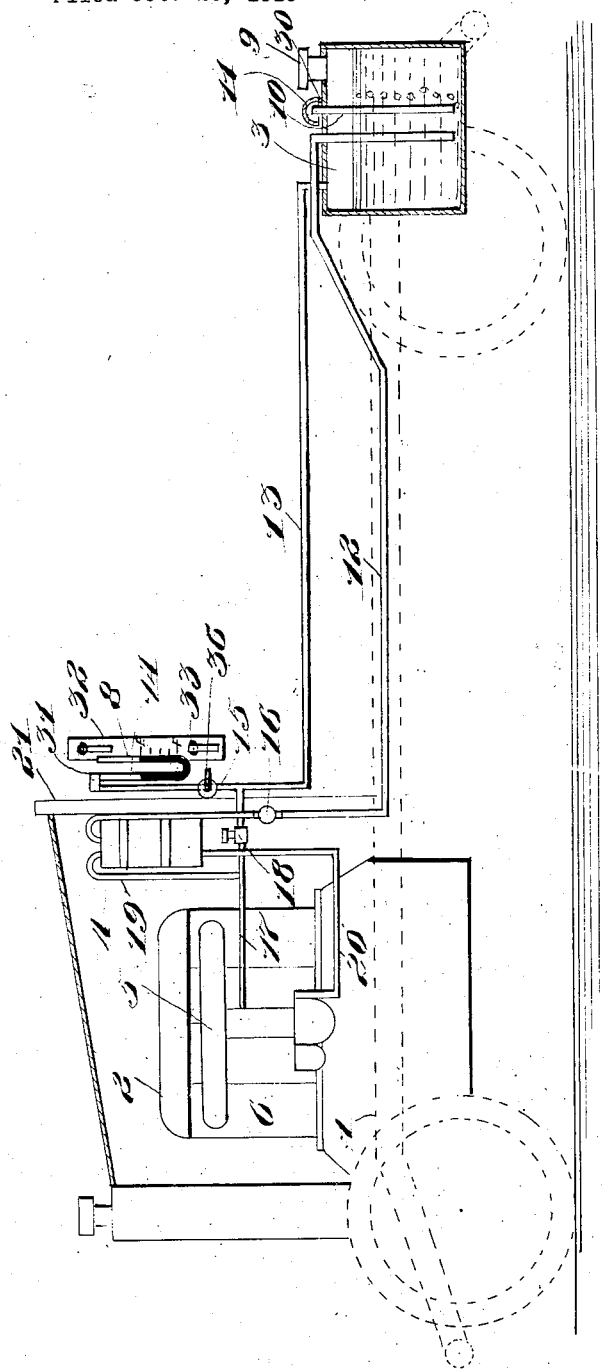
Witnesses
Inventor
William H. Muzzy Patented Jan. 4, 1927.

1,612,829

UNITED STATES PATENT OFFICE.

WILLIAM H. MUZZY, OF CHICAGO, ILLINOIS.

LIQUID-LEVEL INDICATOR.

Application filed October 20, 1919. Serial No. 331,851.

This invention relates to improvements in liquid level indicators and has more particular relation to improvements in indicating systems for indicating the quantity or depth of the fuel supply in the tanks of automobiles.

One of the several objects of the invention is to provide a liquid level indicating system or gage and connections for operating the same in conjunction with the fuel feeding system of an automobile whereby the liquid level indicator is corrected by or upon each operation of the fuel feeding devices to overcome or correct inaccuracies which arise in the indicating system.

Another object of the invention is to provide a liquid level indicator system which includes as an element a fuel feeding vacuum tank and connections arranged by its operation to replenish the air connecting column in the indicating system upon each operation.

Another object of the invention is to provide means for establishing a hydrostatic balance between a pressure indicator and a fuel supply and further means for introducing new air into the connections by the fuel feeding operation and then leaving the system in a static condition uninfluenced except by atmospheric pressure.

A further object of the invention is to provide an indicating system for automobiles in which a hydrostatic balance is established and automatically maintained, between the contents of a fuel tank and a liquid level indicating instrument by the action of the fuel feeding devices.

The invention also has other objects all of which will be hereinafter more particularly set forth and claimed.

In the accompanying drawings forming part of this specification;

The figure represents a side elevation, partly in section, of an automobile with my improved liquid level indicating system applied thereto; some of the parts being on an enlarged scale to more clearly show the invention.

Described in general terms the invention may be said to comprise a closed fuel tank or chamber in which a partial vacuum is created by drawing fuel therefrom intermittently by devices well known in the art. This resulting partial vacuum is established in varying degrees according to the depth of the fuel in the tank, by a vacuum relieving pipe which connects with the atmosphere and extends down to the lowest feeding point of the fuel supply.

A gage or liquid level indicator is so connected to the tank as to register the liquid levels therein, either near the tank or at a distance therefrom as desired. This registration is of course one corresponding to the air pressure in the pipe connecting the gage and tank, as balanced with the atmospheric air pressure on one side of the gage instrument and on the relief pipe in the fuel tank, the pressure in the connecting pipe being sub-atmospheric.

Each time the fuel feeding device operates fresh air is drawn into the air connections between the tank and the gage to provide a fresh balancing medium to communicate the pressure to the gaging instrument. If this air balancing medium is not refreshed or renewed it becomes saturated and "dead" and unreliable for communicating pressures.

It will of course be understood that if all the connecting devices from tank to gage are made absolutely air tight. the operation of the vacuum tank alone will establish the proper pressure in the fuel tank and connections to secure a correct reading on the gage and this correct reading will remain correct just in proportion as the connections are air tight and just in proportion as the air column is "fresh" and effected in a minimum degree by heat or cold. If the connections are well made and air tight a correct indication will remain until the next operation of the vacuum tank when any slight inaccuracy will be corrected. If so desired a slight excess vacuum may be held in the fuel tank, between operations of the fuel feed by a pipe connecting it with the manifold of the engine.

While the new air which enters the tank must pass through the gasoline and takes up some of the same it is at the same time saturated in a much less degree than air which might remain constantly and for extended periods in contact with a volatile liquid. The constantly renewed air is therefore a much more reliable means for communicating pressures and also renews conditions that may have been unbalanced by air leaking into the connections.

Described in detail the frame 1 of the machine supports the engine 2 and the gasoline tank 3 at its opposite ends.

An intermittent fuel feeding vacuum tank 4 of any well known type may be employed. This vacuum tank is connected to the main fuel tank at the rear by a fuel feeding pipe 12 provided with a ball check valve 16 for preventing backward flow of the fuel when the vacuum tank is not pumping.

The gasoline is fed from the vacuum tank to the carbureter 6 by gravity, through a pipe 20. This tank 4 is connected to the manifold of the engine by pipe 17 and branch pipe 19 so that the tank operates to draw gasoline from the rear tank 3 and discharge this fuel intermittently to the lower chamber of the tank 4 and then to the carbureter in a manner so well known in the art that no further description is thought to be necessary.

As the tank 3 is sealed by an air tight cap 9 it will be seen that when the vacuum tank 4 operates to draw fuel from the fuel tank a vacuum is created in this tank. This vacuum however is only of a degree sufficient to cause air to pass down the pipe 10, displacing the gasoline therefrom, and then into the tank. The pipe 10 extends vertically down into the fuel to within a short distance of the bottom of the fuel tank and is protected at its upper end against the entrance of dirt or water, by a cap 11 mounted on short spaced legs 30.

The pipe 17 is connected by a pipe 15 with the member 14 of the liquid level gage 31. The other connected member 8 of the gage being open to the atmosphere at its upper end. The gage plate or index 32 is adjustably mounted by slots and bolts 33 so that it may be adjusted in relation to the level of the liquid in the glass member 8. This gage is mounted on the instrument board 21 of the machine but is shown in the drawings as turned to the side in diagram to more clearly illustrate the invention. Any other suitable form of gage might of course be used to replace the U liquid column. An air column pipe 13 connects the air space of the tank to the gage or pressure indicator 31.

A needle valve 18 of any well known construction is mounted in the pipe 17 so that the suction may be cut down to the minimum which will cause a minimum amount of air to pass down the pipe 10 when the tank is full and thus leave the gage and the contents of the tank balanced as near as possible. Any excess of suction however is automatically taken up by an excess of air passing down the pipe 10. The needle valve prevents the liquid in the gage 31 from being given any sudden and excessive movement which might result in drawing part of the liquid from the gage. The needle valve however is not essential to the operation of the device as the tubes 8 and 14 may be made longer if desired and prevent any spilling of the liquid by an excess vacuum, before it can be relieved by the air passing down the pipe 10.

It will of course be understood that this continuous suction may be dispensed with and the device operated entirely from the vacuum created by the feeding of the fuel and this latter is the preferred form. It will be understood that in this preferred form of the device the gage and connections are in true indicating condition only when in a static balance, that is during the interval between the feeding operations of the vacuum tank of the fuel feeding system. This static period in most cars covers about $\frac{9}{10}$ of the entire time, the remaining $\frac{1}{10}$ being devoted to the feeding operation. From this it will be understood that during the time that the fuel is feeding and air being drawn into the connections that the pressure indicator is being displaced out of a balance with the contents of the tank. This is true because the withdrawal of the fuel must first draw all liquid away from the lower end of the atmosphere air pipe before new air may pass into the connections. After the engine stops the indication is maintained because air cannot enter the tank through the fuel feed pipe which is sealed by the contents of the tank and the check valve 16 and gasoline trapped above it. When the indicating system is thus operated by the fuel feed alone one extra pipe is eliminated. Also less gasoline is vaporized as fresh air is only drawn into the tank periodically.

The office of the check valve 16 is to prevent the liquid in the pipe 12 from returning to the tank 3 when the vacuum tank becomes filled and the suction through the tank is cut off. If this fuel in the pipe 12 returned to the fuel tank it would effect the established vacuum in the tank.

It will be seen from the foregoing that the vacuum in the tank 3 is always in proportion to the depth of the gasoline in the tank, as it requires a greater or less vacuum to displace the liquid in the pipe 10 so that the air at atmospheric pressure may enter the tank.

As the pipe 13 connects the gage with the tank 3 the amount of vacuum in the tank and pipe is always correctly balanced with the liquid in the glass member 8 and this in connection with the scale plate 32 is read as level indications of the fuel. The liquid in the gage is preferably colored glycerine as this is about the proper specific gravity. Any slight inaccuracy may be corrected by adjusting the scale plate 32.

It will be seen from above that the pressure in the connecting air column pipe 13 balanced with atmospheric pressure through the gage and the gasoline in the fuel tank will move the column of glycerine to give the proper depth indication. The vacuum created in the tank being in excess of that in the tank when the feeding operation started will always draw new air into the connections through the pipe 10, and I rely on this new air to revitalize the air column and compensate for leaks and undue expansion or contraction.

I do not care to limit myself to the form of gage shown as any other form for indicating the liquid level may be employed without departing from the spirit of the invention. The location of the gage is also a matter of option as it may be located at any point desired.

It will be further observed that any gas created in the tank 3 by the air from the pipe 10 passing through the fuel will, when the continuous suction is employed, be drawn to the motor for use therein.

The pipe 13 is provided with a three way cock 36 for allowing suction through the pipe or opening the lower part of the pipe to the atmosphere. This cock 36 is only for use in very hot climates where the influence of the sun might cause undue expansion in the rear fuel tank such as might result in fuel being forced out of the pipe 10 when the engine was not running. Under all ordinary circumstances the cock 36 will not have to be used or opened but will remain in the position connecting the two parts of the pipe 13.

Having thus described by invention what I claim as new and desire to secure by Letters Patent is:

In an automobile the combination with the engine thereof, of a closed chamber containing liquid, means operated by the engine for effecting an intermittent flow of the liquid from the chamber, means whereby, upon diminution of pressure within the chamber, new air will be forced thereinto against the head of liquid therein, and a differential pressure indicating means connected on one side to said chamber above the level of the liquid therein and on the other side to the atmosphere.

In testimony whereof I affix my signature.

WILLIAM H. MUZZY.